United States Patent [19]
Lebby et al.

[11] Patent Number: 5,473,716
[45] Date of Patent: Dec. 5, 1995

[54] FIBER BUNDLE INTERCONNECT AND METHOD OF MAKING SAME

[75] Inventors: Michael S. Lebby, Apache Junction; Davis H. Hartman, Phoenix, both of Ariz.

[73] Assignee: Motorola, Inc., Schaumburg, Ill.

[21] Appl. No.: 297,066

[22] Filed: Aug. 29, 1994

[51] Int. Cl.⁶ ................................................ G02B 6/40
[52] U.S. Cl. ................................ 385/54; 385/49; 385/88
[58] Field of Search ............................... 385/49, 50, 52, 385/53, 54, 88, 89

[56] References Cited

U.S. PATENT DOCUMENTS

| | | | |
|---|---|---|---|
| 3,846,010 | 11/1974 | Love et al. ................................. | 385/54 |
| 4,820,010 | 4/1989 | Scifres et al. ......................... | 385/88 X |
| 5,093,879 | 3/1992 | Bregman et al. ..................... | 385/89 X |
| 5,230,030 | 7/1993 | Hartman et al. .......................... | 385/50 |
| 5,263,108 | 11/1993 | Kurokawa et al. ....................... | 385/89 |
| 5,359,686 | 10/1994 | Galloway et al. ......................... | 385/49 |

*Primary Examiner*—John D. Lee
*Attorney, Agent, or Firm*—Miriam Jackson

[57] ABSTRACT

An interconnect for coupling optical fibers and photonic devices. This interconnect is comprised of a fiber bundle formed of a plurality of optical fibers, a plurality of photonic devices, and a connector assembly. The connector assembly is comprised of a first connector and a second connector. The first connector is coupled to the fiber bundle and the second connector is coupled to the plurality of photonic devices. When the first connector and second connector are coupled together in a single connection, the photonic devices align with the optical fibers for optical communication.

32 Claims, 4 Drawing Sheets

FIBER BUNDLE INTERCONNECT AND METHOD OF MAKING SAME

BACKGROUND OF THE INVENTION

This invention relates, in general, to optical fiber systems, and more particularly, to an optical fiber interconnect that incorporates optical fibers, emitters, and detectors.

Presently, the emergence of new markets in data transfer with broad bandwidth and short distance has created interest in the use of optics as an alternative to conventional copper-based interconnects. Many of the high-volume markets in this area require low-cost optical fiber interconnects that can handle many Mb/s of aggregate data transfer. These optical fiber interconnects will need to cost substantially less than $100 per Gb/s and, preferably, lower than $10 per Gb/s.

Currently, fiber ribbons and low cost packaging techniques are being used as a means for reducing the cost of optical fiber interconnects. However, the high cost of fiber ribbon connectors prevent sufficiently low cost optical fiber interconnects from being realized.

Accordingly, it is highly desirable to have a simple and low cost optical fiber interconnect that is especially suitable for short distances.

DETAILED DESCRIPTION OF THE DRAWINGS

Figure 1:
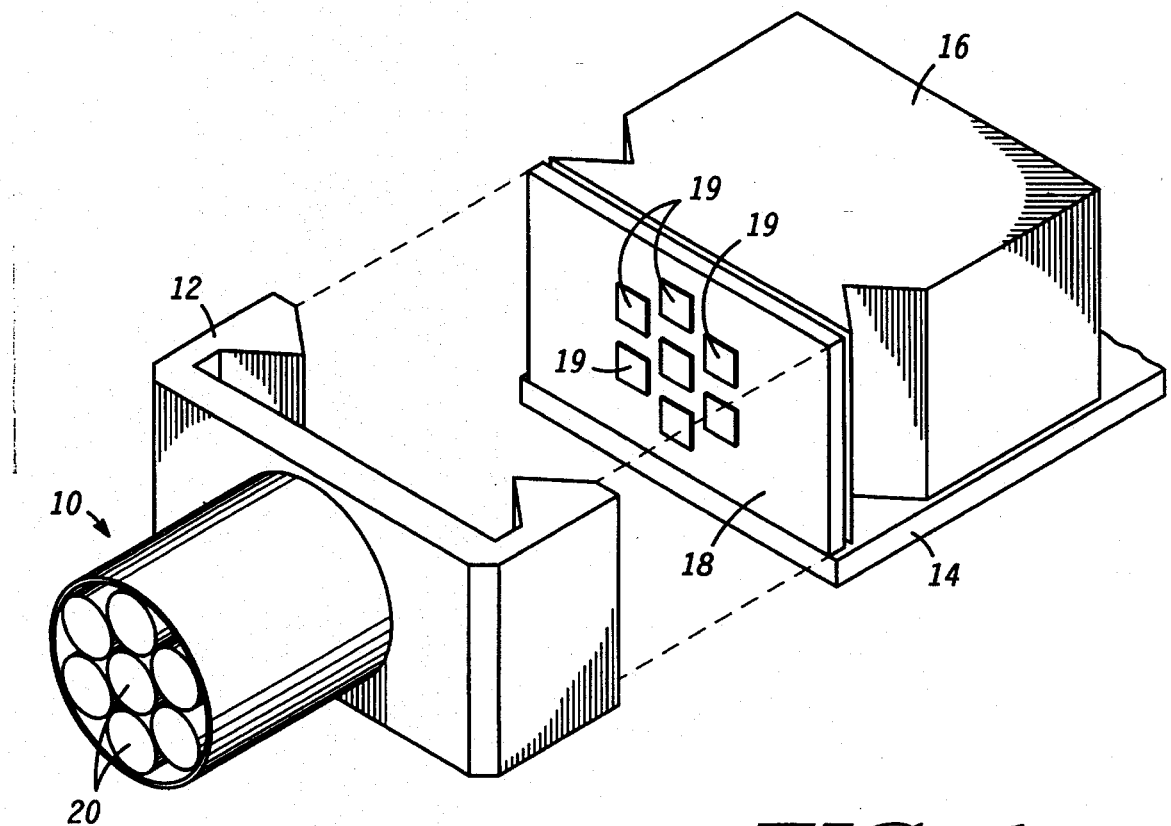
FIG. 1 is a perspective view of a fiber bundle interconnect in accordance with one embodiment of the present invention.

FIG. 1 is a simple illustration showing the principle features of a fiber bundle interconnect in accordance with one embodiment of the present invention. This fiber bundle interconnect provides, in one simple connection, automatic alignment for optical coupling of photonic devices with optical fibers.

Photonic devices 19 are mounted on a photonic device mount 18 and electrically coupled to a circuit board 14, such as an FR4 multilevel circuit board, by wire bonding or flip chipping.

A variety of types of connector assemblies may be used to ensure good alignment and securely couple photonic devices 19 to a plurality of plastic fibers (not shown) housed inside a fiber bundle 10. Preferably, the connector assembly is comprised of two interlocking connector ends, a male end 12 and a female end 16, which are formed of a molded plastic or other low-cost material. Male end 12 is coupled to fiber bundle 10 and female end 16 is coupled to photonic device mount 18. This coupling may be accomplished by such means as adhesives, molding, or a slide connector, among others. Male end 12 and female end 16 are configured so that when coupled together, good optical communication is established between photonic devices 19 and the plastic fibers enclosed in fiber bundle 10. In the embodiment of FIG. 1, a snap-fit connector is used that allows male end 12 to snap on to or slide over the top of female end 16.

Figure 2:
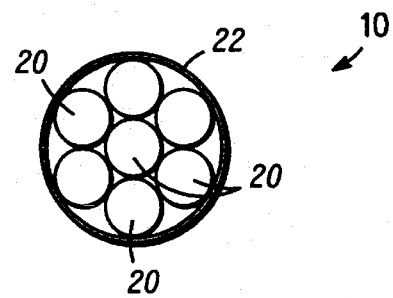
FIG. 2 is a cross-sectional view of a fiber bundle.

FIG. 2 is a cross-sectional view of fiber bundle 10. Fiber bundle 10 is comprised of a plurality of plastic fibers 20 surrounded by a sheath 22 which may be comprised of a fire retardant plastic such as KOVAR. Preferably, plastic fibers 20 are in a hexagonal configuration, as shown in FIG. 2, as this is the most densely packed fiber configuration. However, other tightly packed configurations are, of course, possible. Also, fiber ribbons, where plastic fibers 20 are arranged side by side, may also be used. Plastic fibers 20 have diameters ranging from approximately 200 μm to 1 mm, and preferably, have diameters larger than the emission holes of photonic devices 19. Plastic fibers 20 may be either step-index (SI) fibers or graded-index (GRIN) fibers.

By using plastic fibers 20, a low-cost information channel can be obtained that is particularly effective for short distances.

Figure 3:
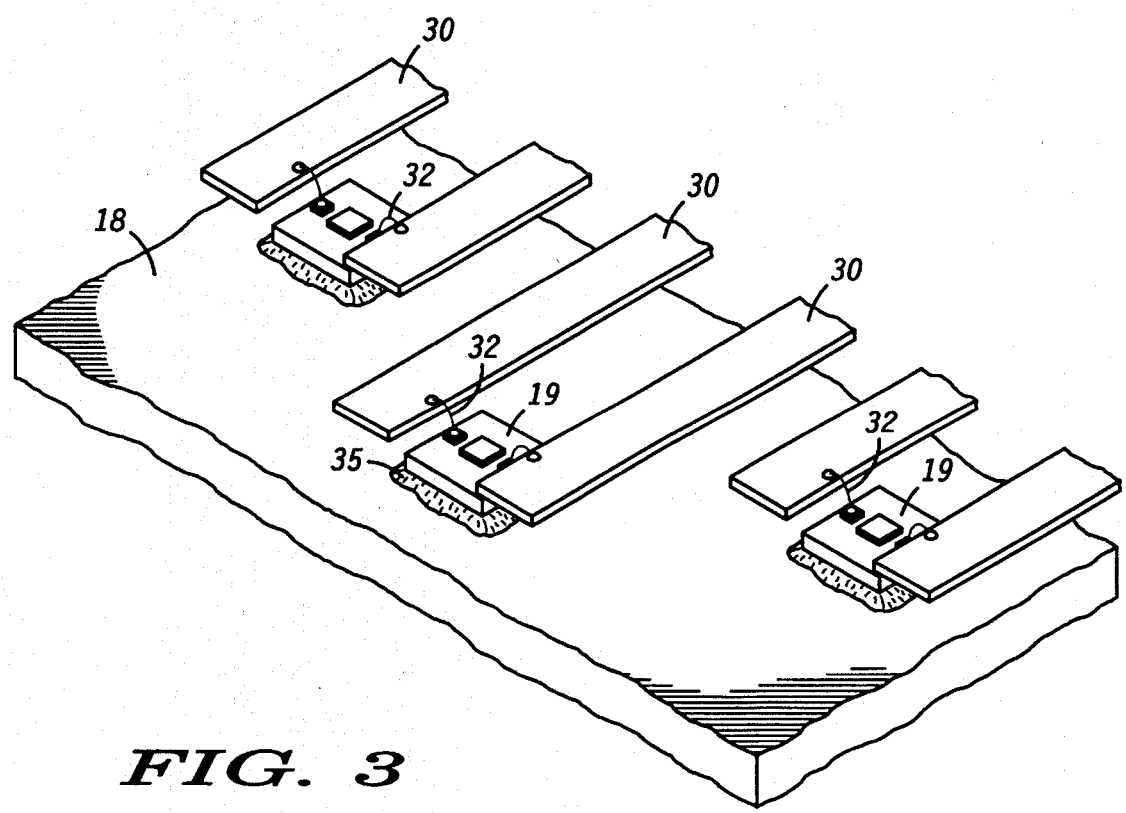
FIG. 3 is a perspective view of a photonic device mount in accordance with one embodiment of the present invention.
Figure 4:
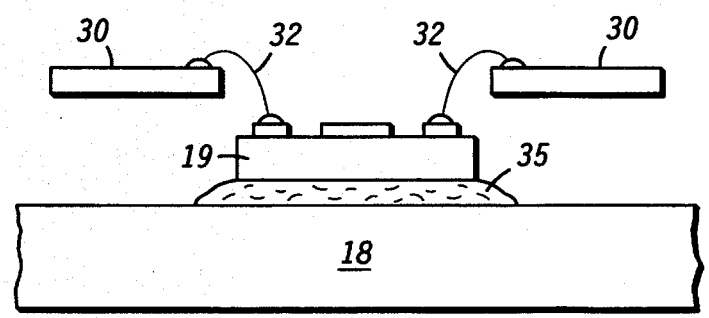
FIG. 4 is a side view of FIG. 2.

FIGS. 3 and 4 show, in greater detail, one possible structure of photonic device mount 18. Preferably, photonic device mount 18 is comprised almost entirely of plastic, as a metal-based photonic device mount may limit high-speed operation due to intrinsic capacitance. The only portions of photonic device mount 18 that require metal are lead frames 30 and wires 32 which connect photonic devices 19 to lead frames 30.

In FIG. 3, lead frames 30 are arranged on the exterior surface of photonic device mount 18 and extend down to circuit board 14 (not shown). However, it is also possible for lead frames 30 to be embedded inside photonic device mount 18.

Photonic devices 19 are mounted on photonic device mount 18 via an epoxy 35 and arranged to correspond to the configuration of plastic fibers 20 shown in FIG. 2. Photonic devices 19 are comprised of phototransmitting and photoreceiving devices. In a preferred embodiment, the phototransmitting devices are light emitting diodes (LEDs) or vertical cavity surface emitting lasers (VCSELs) and the photoreceiving devices are either gallium arsenide or silicon-based PIN photodetectors.

In order to protect photonic devices 19, photonic device mount 18 may be overmolded with a transparent epoxy molding compound (not shown).

Figure 5:
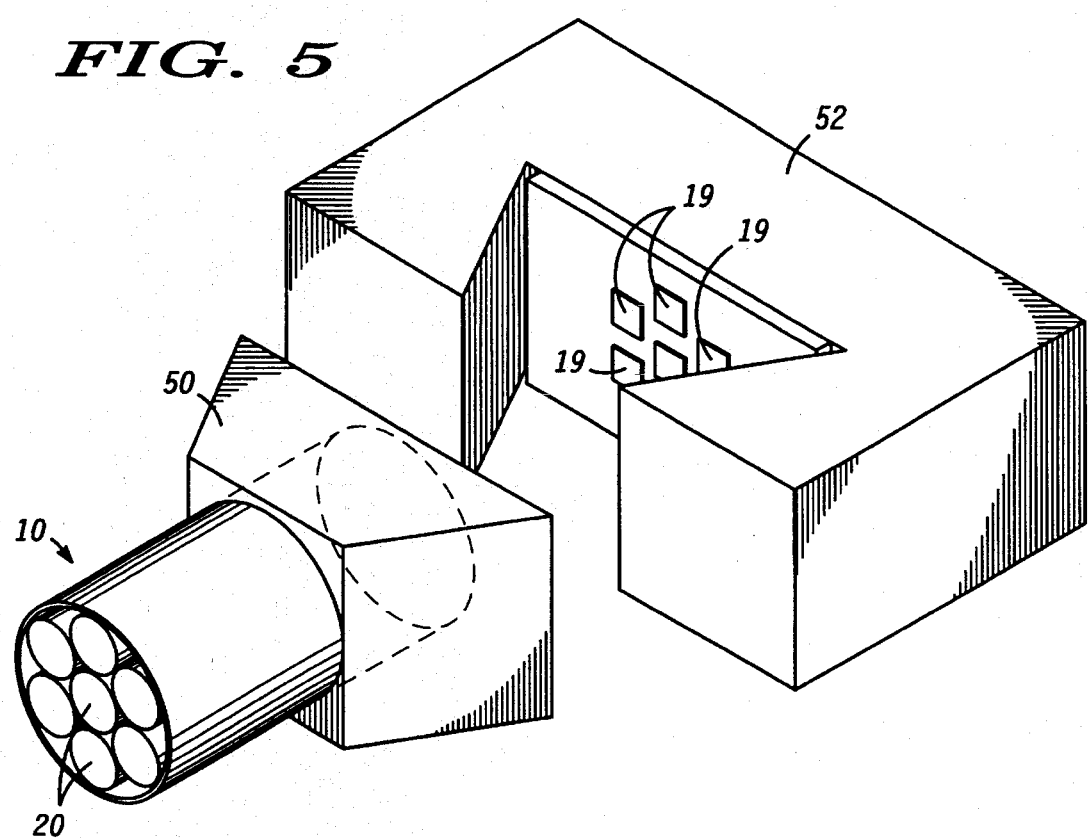
FIG. 5 is a perspective view of a fiber bundle interconnect in accordance with another embodiment of the present invention.

FIG. 5 illustrates a key-slotted connector assembly that may be used instead of the snap-fit connector described above to force alignment between plastic fibers 20 inside fiber bundle 10 and photonic devices 19. Key-slotted connector is comprised of a male end 50 molded around fiber bundle 10 and a female end 52. Male end 50 and female end 52 may be easily formed through injection molding.

Figure 6:
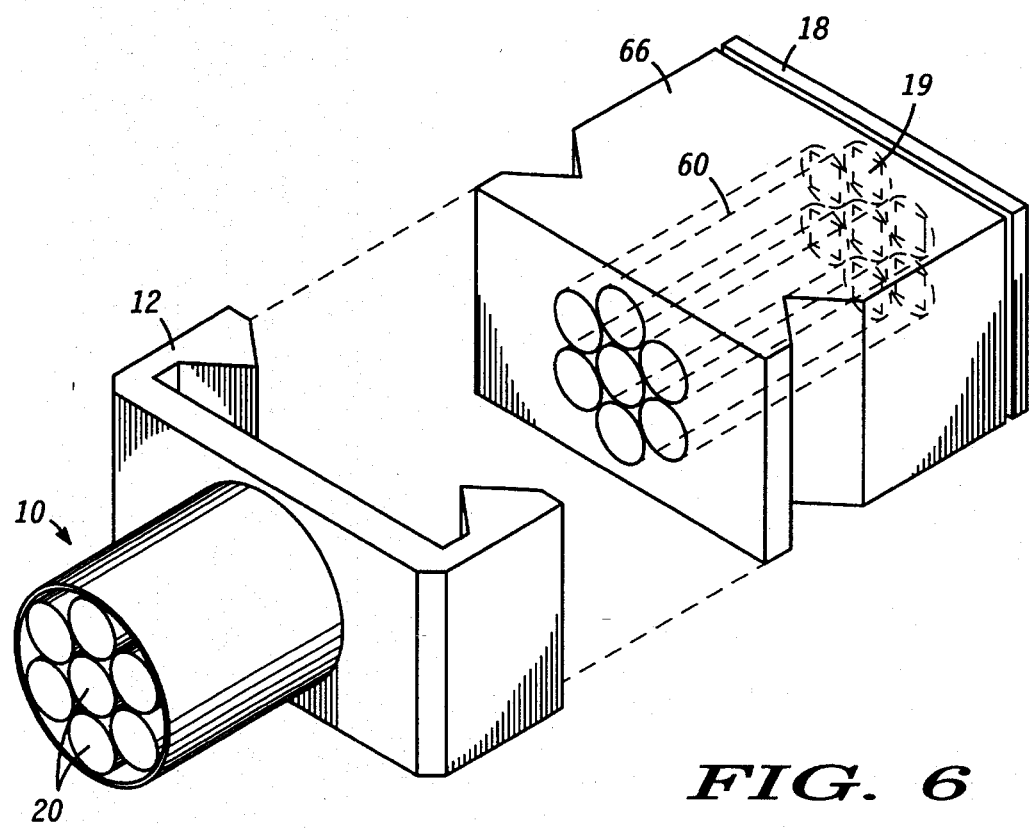
FIG. 6 is a perspective view of a fiber bundle interconnect in accordance with still another embodiment of the present invention.

FIG. 6 shows a perspective view of a fiber bundle interconnect that utilizes waveguides in accordance with another embodiment of the present invention. By using waveguides, better optical alignment between the photonic devices and the optical fibers can be achieved. The embodiment of FIG. 6 is similar to FIG. 1, therefore, the same reference numbers will be used to refer to the same elements.

Waveguides 60 are formed from plastic fiber and then overmolded, preferably by injection molding, to form a female end 66 of a connector. Forming waveguides 60 of plastic fiber instead of glass fiber not only provides advantages in cost, but increases the ease in which waveguides 60 can be incorporated into female end 66. Plastic fibers can be easily cut with a hot knife or guillotine whereas glass fibers would need to be cleaved or polished.

The diameter of waveguides 60 is approximately 200 µm to 1 mm. Preferably, the diameter of waveguides 60 coupled to photoreceiving photonic devices 19 is equal to or larger than the diameter of plastic fibers 20 in fiber bundle 10 and the diameter of waveguides 60 coupled to phototransmiting photonic devices 19 is equal to or less than the diameter of plastic fibers 20 in fiber bundle 10.

Photonic device mount 18 with photonic devices 19 is coupled to female end 66 so that photonic devices 19 are optically aligned with waveguides 60.

Male end 12 of the connector is attached to fiber bundle 10. By coupling male end 12 to female end 66, waveguides 60 are forced to align with the plastic fibers inside fiber bundle 10 in a single connection.

Because waveguides 60 provide the core and cladding necessary for light transmission, it is not necessary to form female end 66 of transparent molding. A nontransparent molding may instead be used. Opaque molding compound is advantageous because commercial mold compounds of their type are readily available, and because these materials are heavily filled with mechanical stabilizers such as silica, resulting in superior thermal and mechanical properties.

Figure 7:
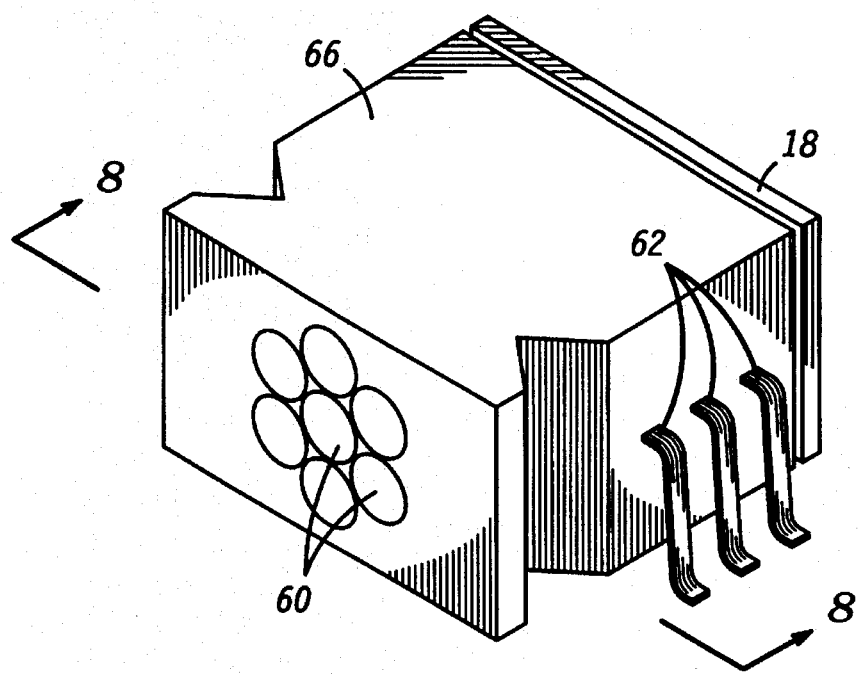
FIG. 7 is a perspective view of a lead frame configuration in accordance with the present invention.

One type of lead frame configuration has been shown in FIG. 3. In FIG. 3, lead frames 30 are arranged on the surface of photonic device mount 18 and extend down from photonic devices 19 to circuit board 14. However, other configurations are possible. For example, FIG. 7 shows a perspective view of another type of lead frame configuration when implemented with the embodiment of FIG. 6. Lead frames 62 extend out from the side of female end 66 of the connector, forming "legs." These legs are then electrically coupled to the top of a circuit board. Because of the compactness of the legs, a fiber bundle interconnect with smaller dimensions may be realized.

Figure 8:
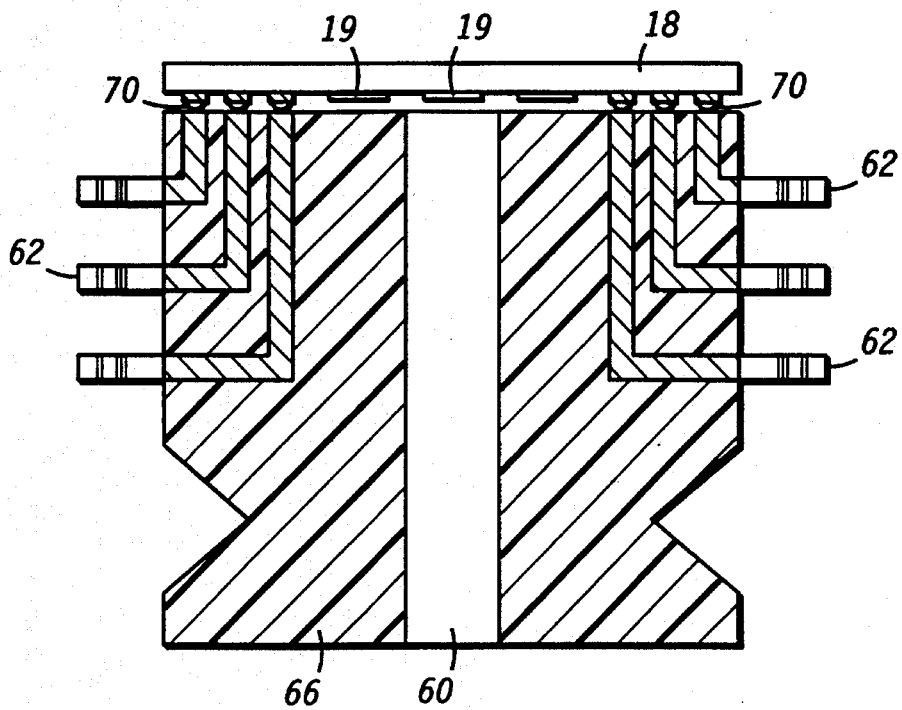
FIG. 8 is a cross-sectional view of the lead frame configuration of FIG. 7.

FIG. 8 shows a cross-section of FIG. 7 taken from line 8—8. Photonic device 19 makes electrical contact with lead frames 62 via interconnect bumps 70. Typically, solder bumps are used as interconnect bumps 70. Lead frames 62 are formed inside female end 66 so as to avoid interfering with waveguide 60 and to extend out of female end 66.

Thus, in accordance with the present invention, a low-cost optical fiber interconnect is provided that automatically aligns photonic devices, waveguides, and plastic fibers in a single connection and is easy to manufacture.

While the present invention has been described in conjunction with several specific embodiments, it is evident to those skilled in the art that further alternatives, modifications, and variations will be apparent in light of the foregoing description. The invention described herein is intended to embrace all such alternatives, modifications, variations and applications as may fall within the spirit and scope of the appended claims.

What is claimed is:

1. An apparatus for coupling optical fibers and photonic devices comprising:

a plurality of optical fibers arranged in a packed configuration;

a plurality of photonic devices arranged in said packed configuration;

a first interlocking connector coupled to said plurality of optical fibers;

a second interlocking connector coupled to said plurality of photonic devices; and wherein said plurality of photonic devices are aligned with said plurality of optical fibers for optical communication when said first interlocking connector is coupled to said second interlocking connector.

2. The apparatus of claim 1 wherein said plurality of optical fibers are comprised of plastic fibers.

3. The apparatus of claim 2 wherein said plurality of optical fibers each have a diameter and said diameter ranges from 200 µm to 1 mm.

4. The apparatus of claim 3 wherein said plurality of photonic devices are mounted to a photonic device mount comprised almost entirely of plastic.

5. The apparatus of claim 2 wherein said packed configuration is a hexagonal configuration.

6. The apparatus of claim 5 further comprising a circuit board electrically coupled to said plurality of photonic devices.

7. The apparatus of claim 1 wherein said plurality of photonic devices are comprised of at least one phototransmitting device.

8. The apparatus of claim 7 wherein said at least one phototransmitting device is a device selected from the group of devices comprised of light emitting diodes and vertical cavity surface emitting lasers.

9. The apparatus of claim 7 wherein said at least one phototransmitting device has an emission hole and said plurality of optical fibers each have a diameter, said diameter being larger than said emission hole.

10. The apparatus of claim 1 wherein said plurality of photonic devices are comprised of at least one photoreceiving device.

11. The apparatus of claim 10 wherein said at least one photoreceiving device is a device selected from the group of devices comprised of gallium arsenide-based PIN photodetectors and silicon-based PIN photodetectors.

12. The apparatus of claim 1 further comprising a plurality of waveguides for transmitting light between said plurality of photonic devices and said plurality of optical fibers, said plurality of waveguides formed within said second interlocking connector.

13. The apparatus of claim 12 wherein said plurality of waveguides are comprised of plastic fibers.

14. The apparatus of claim 13 wherein said plurality of waveguides each have a diameter and said plurality of optical fibers each have a diameter, said diameter of said plurality of waveguides being less than said diameter of said plurality of optical fibers.

15. The apparatus of claim 1 further comprising a circuit board electrically coupled to said plurality of photonic devices by way of interconnect bumps.

16. An apparatus for coupling optical fibers and photonic devices comprising:

a fiber bundle comprised of a plurality of optical fibers;

a plurality of photonic devices arranged in a configuration similar to said fiber bundle;

a first interlocking connector coupled to said fiber bundle;

a second interlocking connector coupled to said plurality of photonic devices;

a plurality of waveguides comprised of fibers for transmitting light between said plurality of photonic devices and said plurality of optical fibers, said plurality of waveguides formed within said second interlocking connector and aligned with said plurality of photonic devices; and wherein said plurality of waveguides are aligned for optical communication with said plurality of optical fibers when said first interlocking connector is coupled to said second interlocking connector.

17. The apparatus of claim 16 wherein said plurality of waveguides are comprised of plastic fibers.

18. The apparatus of claim 17 wherein said plurality of waveguides each have a diameter and said plurality of optical fibers each have a diameter, said diameters of said plurality of waveguides being less than said diameters of said plurality of optical fibers.

19. The apparatus of claim 17 wherein said plurality of optical fibers are plastic fibers.

20. The apparatus of claim 19 wherein said plastic fibers have diameters and said diameters range from 200 μm to 1 mm.

21. The apparatus of claim 19 wherein said plurality of photonic devices are mounted to a photonic device mount comprised almost entirely of plastic.

22. The apparatus of claim 19 wherein said plurality of optical fibers and said plurality of said photonic devices are arranged in a hexagonal configuration.

23. The apparatus of claim 16 wherein said plurality of photonic devices are comprised of at least one phototransmitting device.

24. The apparatus of claim 23 wherein said at least one phototransmitting device is a device selected from the group of devices comprised of light emitting diodes and vertical cavity surface emitting lasers.

25. The apparatus of claim 16 wherein said plurality of photonic devices are comprised of at least one photoreceiving device.

26. The apparatus of claim 25 wherein said at least one photoreceiving device is a device selected from the group of devices comprised of gallium arsenide-based PIN photodetectors and silicon-based PIN photodetectors.

27. The apparatus of claim 16 further comprising a circuit board electrically coupled to said plurality of photonic devices.

28. The apparatus of claim 27 wherein said circuit board is electrically coupled to said plurality of photonic devices through said second interlocking connector via solder bumps.

29. The apparatus of claim 16 wherein said second interlocking connector is comprised of a nontransparent molding.

30. A method of manufacturing a fiber bundle interconnect comprising the steps of:

providing a fiber bundle having an end and comprised of a plurality of optical fibers arranged in a packed configuration;

coupling a first interlocking connector to said end of said fiber bundle;

coupling a second interlocking connector to a plurality of photonic devices arranged to correspond to said packed configuration; and coupling said first interlocking connector to said second interlocking connector so that said plurality of photonic devices align with said plurality of optical fibers for optical communication.

31. The method of claim 30 further comprising the step of forming a plurality of waveguides comprised of fibers in said second interlocking connector so that said plurality of waveguides are aligned with said plurality of photonic devices and said plurality of optical fibers for optical communication.

32. The method of claim 30 further comprising the step of coupling said plurality of photonic devices to a circuit board.

* * * * *